(12) United States Patent
Miller, Jr. et al.

(10) Patent No.: US 9,690,483 B2
(45) Date of Patent: *Jun. 27, 2017

(54) ASYNCHRONOUSLY CLEARING PAGE FRAMES

(71) Applicant: International Business Machines Corporation, Armonk, NY (US)

(72) Inventors: Robert Miller, Jr., Poughkeepsie, NY (US); Steven M. Partlow, Beacon, NY (US); Thomas F. Rankin, Tilson, NY (US); Scott B. Tuttle, Staarsburg, NY (US); Elpida Tzortzatos, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/399,087

(22) Filed: Jan. 5, 2017

(65) Prior Publication Data

US 2017/0109051 A1  Apr. 20, 2017

Related U.S. Application Data

(63) Continuation of application No. 15/135,875, filed on Apr. 22, 2016, which is a continuation of application No. 14/869,178, filed on Sep. 29, 2015.

(51) Int. Cl.
*G06F 13/00* (2006.01)
*G06F 3/06* (2006.01)
*G06F 12/08* (2016.01)

(52) U.S. Cl.
CPC .......... *G06F 3/0604* (2013.01); *G06F 3/0637* (2013.01); *G06F 3/0644* (2013.01); *G06F 3/0652* (2013.01); *G06F 3/0665* (2013.01); *G06F 3/0673* (2013.01); *G06F 12/08* (2013.01); *G06F 2212/152* (2013.01); *G06F 2212/657* (2013.01)

(58) Field of Classification Search
CPC . G06F 3/06; G06F 13/00; G06F 12/00; G06F 12/12
See application file for complete search history.

(56) References Cited

U.S. PATENT DOCUMENTS

2014/0075142 A1  3/2014  Hom et al.
2015/0363199 A1  12/2015  Gainey, Jr. et al.

*Primary Examiner* — Charles Rones
*Assistant Examiner* — Han Doan
(74) *Attorney, Agent, or Firm* — Cantor Colburn LLP; William Porter

(57) ABSTRACT

In one embodiment, a computer-implemented method includes producing one or more clean frames by clearing a batch of one or more frames for use in backing virtual memory pages. The producing the one or more clean frames may be performed asynchronously from a unit of work being performed by a processor. The one or more clean frames may be added to a clean frame queue, where the clean frame queue includes a plurality of clean frames that have been cleared. A first request may be received, from the processor, for a frame for use in backing a virtual memory page of the unit of work. A clean frame, of the one or more clean frames, may be removed from the clean frame queue, responsive to the first request. The clean frame may be delivered to the processor, responsive to the first request.

1 Claim, 5 Drawing Sheets

ASYNCHRONOUSLY CLEARING PAGE FRAMES

DOMESTIC PRIORITY

This application is a continuation of and claims priority from U.S. patent application Ser. No. 15/135,875, filed Apr. 22, 2016, entitled "ASYNCHRONOUSLY CLEARING PAGE FRAMES," which in turn claims priority from U.S. patent application Ser. No. 14/869,178, filed Sep. 29, 2015. The entire contents of all of the applications listed above are incorporated herein by reference.

BACKGROUND

Embodiments of the present invention relate to page frames and, more specifically, to asynchronously clearing page frames.

Generally, a computer's operating system manages its virtual memory and main memory. Virtual memory pages are assigned to applications and backed by (i.e., stored in) page frames in main memory when used. In the case of the z/OS operating system from International Business Machines®, a storage manager clears 1 MB page frames by using the perform frame management function (PFMF) instruction with a clear frame option. This instruction is issued to clear a page frame when processing a request to obtain a 1 MB page frame while running under the unit of work that needs the frame. Access to available page frames is serialized, so additional processor cycles are spent waiting for a spin lock to obtain frames when there is contention on the spin lock.

SUMMARY

According to an embodiment of this disclosure, a computer-implemented method includes producing one or more clean frames by clearing a batch of one or more frames for use in backing virtual memory pages. The producing the one or more clean frames may be performed asynchronously from a unit of work being performed by a processor. The one or more clean frames may be added to a clean frame queue, where the clean frame queue includes a plurality of clean frames that have been cleared. A first request may be received, from the processor, for a frame for use in backing a virtual memory page of the unit of work. A clean frame, of the one or more clean frames, may be removed from the clean frame queue, responsive to the first request. The clean frame may be delivered to the processor, responsive to the first request.

In another embodiment, a system includes a memory and one or more computer processors communicatively coupled to the memory. The one or more computer processors are configured to produce one or more clean frames by clearing a batch of one or more frames for use in backing virtual memory pages. Producing the one or more clean frames may be performed asynchronously from a unit of work being performed by a first processor. The one or more computer processors may be further configured to add the one or more clean frames to a clean frame queue, where the clean frame queue includes a plurality of clean frames that have been cleared. The one or more computer processors may be further configured to receive, from the first processor, a first request for a frame for use in backing a virtual memory page of the unit of work. The one or more computer processors may be further configured to remove a clean frame, of the one or more clean frames, from the clean frame queue, responsive to the first request. The one or more computer processors may be further configured to deliver the clean frame to the first processor, responsive to the first request.

In yet another embodiment, a computer program product for managing frames includes a computer readable storage medium having program instructions embodied therewith. The program instructions are executable by a processor to cause the processor to perform a method. The method includes producing one or more clean frames by clearing a batch of one or more frames for use in backing virtual memory pages. The producing the one or more clean frames may be performed asynchronously from a unit of work being performed by a first processor. Further according to the method, the one or more clean frames may be added to a clean frame queue, where the clean frame queue includes a plurality of clean frames that have been cleared. A first request may be received, from the first processor, for a frame for use in backing a virtual memory page of the unit of work. A clean frame, of the one or more clean frames, may be removed from the clean frame queue, responsive to the first request. The clean frame may be delivered to the first processor, responsive to the first request.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Using the perform frame management function (PFMF) clear frame option in the z/OS operating system is inefficient and adds processor cycles to the process of obtaining and clearing page frames. The additional processor time of these processor cycles is charged to the unit of work that needs the page frames. In many cases, customers rent processing power on servers, and their cost of renting may be based in part on the processing cycles they use. Thus, the processor cycles wasted to obtain page frames result in additional costs to customers.

Various embodiments of this disclosure may reduce the inefficiencies in obtaining page frames, also referred to herein as frames, by clearing frames ahead of time in an asynchronous manner. In this way, frames may be pre-cleared and placed on a queue of clean frames. Thus, when a frame is needed, it need not be cleared, and the clearing of the frame need not be charged to the unit of work needing the frame.

Figure 1:
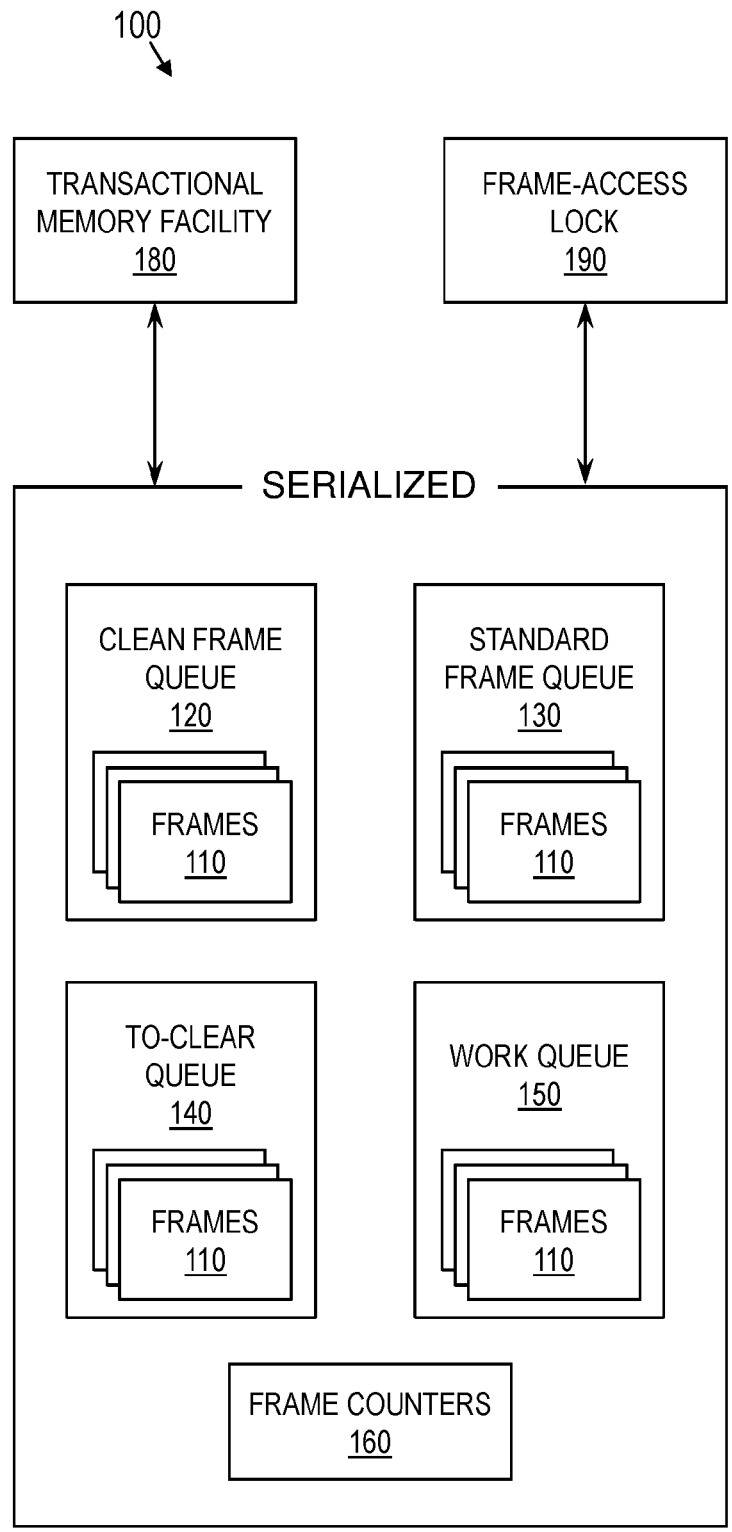
FIG. 1 is a block diagram of a frame-management system, according to some embodiments of this disclosure.

FIG. 1 is a block diagram of a frame-management system 100, according to some embodiments of this disclosure. The frame-management system 100 may asynchronously clear frames 110. Herein, the term "asynchronous" refers to activities occurring without synchronization with performance of units of work. Further, in some embodiments, the clearing of frames 110 may be performed, in whole or in part, on one or more processors not in the act of executing units of work. For example, and not by way of limitation, these one or more processors may be located on hardware accelerators.

As shown, the frame-management system 100 may include various queues and a set of frame counters 160 that enable management and clearing of frames 110. In some embodiments, the frames 110 available for use by units of work may be a variety of sizes, for example, 1 MB, 4 KB, or 2 GB. In some embodiments, a distinct set of the various frame queues and counts described below may exist for each size of frame 110, such that a queue does not contain frames 110 of multiple sizes. In such embodiments, the exception may be a system available count, which will be described further below, and which maintains a count of all available frames 110 regardless of size. Throughout this disclosure, reference is made to a single set of queues and frame counters 160 related to frames 110 of a fixed size. It will be understood, however, that the same or similar operations may be performed on other sets of queues and frame counters 160 to manage frames 110 of other sizes.

The frame-management system 100 may include a clean frame queue 120 and a standard frame queue 130, both of which are available frame queues maintaining frames 110 that are available for use. Specifically, the clean frame queue 120 may maintain available frames 110 that are clean (i.e., have already been cleared for use), and the standard frame queue 130 may maintain frames 110 that have not yet been cleared for use. In some embodiments, the frame counters 160 may maintain a size-specific available frame count, which may equal the number of available frames 110 that are on a combination of the clean frame queue 120 and the standard frame queue 130, and are thus available for use. In some embodiments, the frame counters 160 may also include a separate count of clean frames 110 on the clean frame queue 120 and another count of frames 110 not yet cleared on the standard frame queue 110.

The frame counters 160 may further maintain a system available frame count, which may equal the total number of frames 110 of all sizes available for use, whether clean or not. Thus, in some embodiments, the system available frame count may remain no smaller than each of the size-specific available frame count, the count of clean frames 110, and the count of frames 110 not yet cleared.

The frame-management system 100 may additionally include a to-clear queue 140 and a work queue 150. The to-clear queue 140 may maintain frames 110 waiting to be cleared and added to the clean frame queue 120. The work queue 150 may maintain frames 110 on which clearing operations are being performed. In some embodiments, for instance, moving a frame 110 from the to-clear queue 140 to the work queue 150 may indicate that the frame 110 is on deck to be cleared. The frame counters 160 may further maintain counts corresponding to the number of frames 110 on each of the to-clear queue 140 and the work queue 150.

One of skill in the art will understand how to modify the frame counters 160, and the various counts maintained therein, based on the operations described below. In some cases in this disclosure, modification of the counts is specifically described, but it will be understood that counts may be modified in operations other than those where such modification is specifically mentioned, as will be understood by one skilled in the art.

Some embodiments of the frame-management system 100 may use the perform-main-storage-operation (PMSO) facility, a feature of the z13 processor from International Business Machines®, to clear frames 110. Although references to the PMSO facility are made repeatedly below, it will be understood that embodiments of this disclosure are not limited to use of the PMSO facility. Rather, some embodiments of the frame-management system 100 may clear frames 110 through use of a service request block (SRB) or other mechanism enabling code to be performed by a processor other than a processor performing the unit of work that requested the frame 110. Thus, where reference is made in this disclosure to the PMSO facility, it will be understood that another frame-clearing facility may be substituted.

In some embodiments, access to unused frames 110 may be serialized. Further, in some embodiments, a transactional memory facility 180, a frame-access lock 190, or a combination of both may be used to serialize access to unused frames 110. For example, and not by way of limitation, the frame-access lock 190 may be a spin lock, such as a real storage manager global lock (RSMGL).

A transactional memory facility 180 may reduce the number of processor cycles used to process a frame request by reducing the number of processor cycles spent spinning on the frame-access lock 190 when contention exists. However, embodiments of this disclosure are not limited to using a transactional memory facility 180 where reference is made to the transactional memory facility 180 below. Rather, some embodiments of the frame-management system 100 may use an alternative, or additional, mode of serialization, such as another lock. Thus, where reference is made in this disclosure to the transactional memory facility 180, it will be understood that another serialization mechanism may be substituted.

Figure 2:
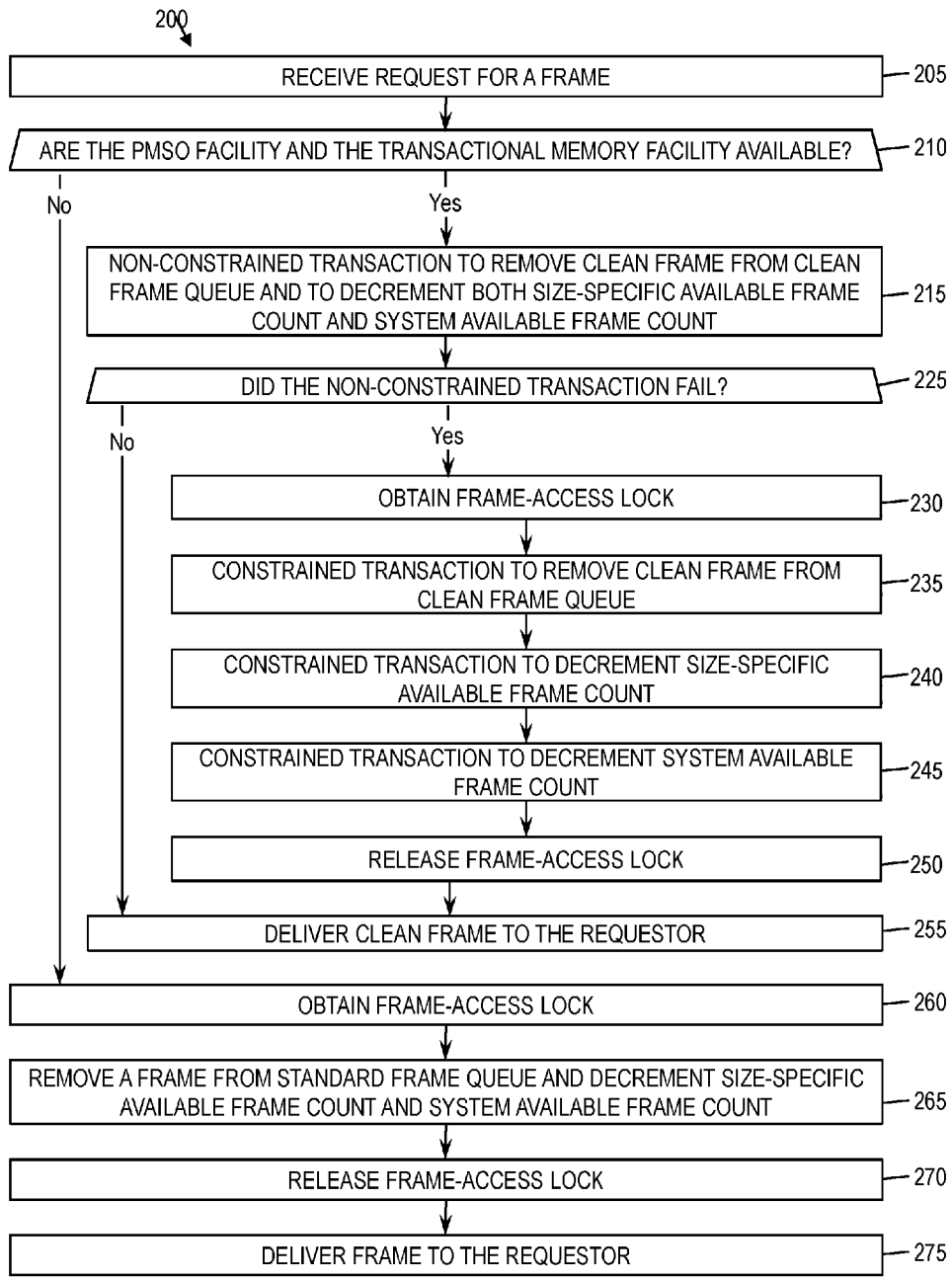
FIG. 2 is a flow diagram of a method for obtaining a frame, according to some embodiments of this disclosure.

To back its virtual memory pages when they come into use, a unit of work may require a frame 110. According to some embodiments, a processor performing the unit of work may thus request a frame 110 for the unit of work, and the frame 110 received in response to the request may have been asynchronously cleared already. FIG. 2 is a method 200 for obtaining a frame 110 based on that request, according to some embodiments of this disclosure.

As shown, at block 205, a request may be received for a frame 110. In some embodiments, the request may specify a size of the frame 110 to be provided. Thus, the operations described below may apply to frames 110 of the requested size. At decision block 210, it may be determined whether the PMSO facility and the transactional memory facility 180 are available. In some embodiments, however, alternatives to these facilities may be used, as discussed above.

If both the PMSO facility and the transactional memory facility 180 are available, then at block 215, using a non-constrained transaction by way of the transactional memory facility 180, a frame 110 may be removed from the clean frame queue 120, and both the size-specific available frame count and the system available frame count may be decremented. At decision block 225, it may be determined whether the non-constrained transaction failed. Generally, while non-constrained transactions allow more latitude than constrained transactions with respect to how many and which accesses can be performed within a single transaction, non-constrained transactions also have a potential for failure. If the non-constrained transaction failed, then at block 230, the frame-access lock 190 may be obtained. At block 235, in a first constrained transaction, a frame 110 may be removed from the clean frame queue 120. At block 240, in a second constrained transaction, the size-specific available frame count may be decremented. At block 245, in a third constrained transaction, the system available frame count may be decremented. In some embodiments, the first, second, and third constrained transactions are distinct constrained transactions performed by way of the transactional memory facility 180. At block 250, the frame-access lock 190 may be released.

If the non-constrained transaction failed, this may be because other processors are trying to update the same storage area. Obtaining the frame-access lock 190 in this case may result in serializing with those other processors, which may take the same path if their non-constrained transactions also fail. However, in this case, the use of constrained transactions may ensure serialization with processors that succeed with their non-constrained transactions. Thus, in case of failure of the non-constrained transaction, some embodiments may obtain the frame-access lock 190 as well as use the transactional memory facility 180, as described above with reference to blocks 230 through 250.

At block 255, regardless of whether the non-constrained transaction succeeded, the frame 110 removed from the clean frame queue 120 may be delivered to the requestor. The requestor may detect that the frame 110 is already clean, such as by accessing the page frame table entry (PFTE) corresponding to the frame 110, and may thus use the frame 110 without clearing it.

If either the PMSO facility or the transactional memory facility 180 is unavailable at block 210, then at block 260, the frame-access lock 190 may be obtained. At block 265, a frame 110 may be removed from the standard frame queue 130, which may maintain available frames 110 that have not yet been cleared. Additionally, both the system available frame count and the size-specific available frame count may be decremented. At block 270, the frame-access lock 190 may be released. At block 275, the frame 110 removed from the standard frame queue 130 may be delivered to the requestor. In this case, the requestor may detect that the frame 110 is not clean, such as by checking the PFTE, and may clear it before use.

Figure 3:
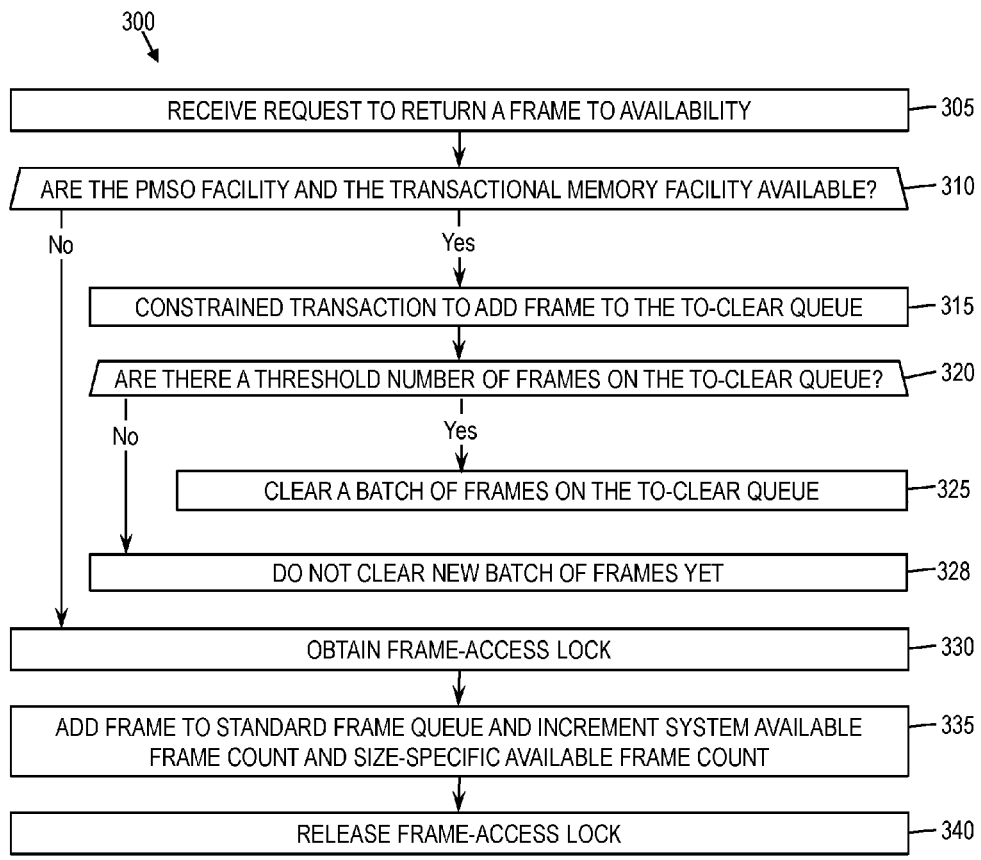
FIG. 3 is a flow diagram of a method for returning a frame, according to some embodiments of this disclosure.

When a unit of work is no longer using a frame 110, that frame 110 may be released by the processor performing the unit of work. The frame 110 may thus be returned to availability. FIG. 3 is a flow diagram of a method 300 for returning a frame 110, according to some embodiments of this disclosure.

At block 305, a request may be received to return a frame 110 to availability. At decision block 310, it may be determined whether the PMSO facility and the transactional memory facility 180 are available. In some embodiments, however, alternatives to these facilities may be used, as discussed above.

If both the PMSO facility and the transactional memory facility 180 are available, then at block 315, the frame 110 being returned may be queued on the to-clear queue 140, using a constrained transaction. At decision block 320, it may be determined whether there are now a threshold number of frames 110 on the to-clear queue 140. This threshold may be defined by a designer or user of the frame-management system 100, and may contribute to how frequently batches of frames 110 are cleared. A high threshold may result in the work of clearing frames 110 being performed less often, which may risk there not being clear frames 110 available when needed, but may also reduce the per-frame overhead of clearing batches of frames 110. In contrast, a low threshold may result in the work of clearing frames 110 being performed more often, which may make it more likely that clear frames 110 will be available when needed, but may also increase the per-frame overhead of clearing batches of frames 110. If the quantity of frames 110 in the to-clear queue 140 is at least the threshold, then at block 325, a batch of frames 110 may be cleared, as will be discussed in more detail below. If the number of frames 110 on the to-clear queue 140 is below the threshold, then at block 328, a batch of frames 110 need not be cleared yet.

If either the PMSO facility or the transactional memory facility 180 is unavailable at block 310, then at block 330, the frame-access lock 190 may be obtained. At block 335, the frame 110 being returned may be queued to the standard frame queue 130, which may maintain available frames 110 that have not yet been cleared. Additionally, both the system available frame count and the size-specific available frame count may be incremented. At block 340, the frame-access lock 190 may be released.

Figure 4:
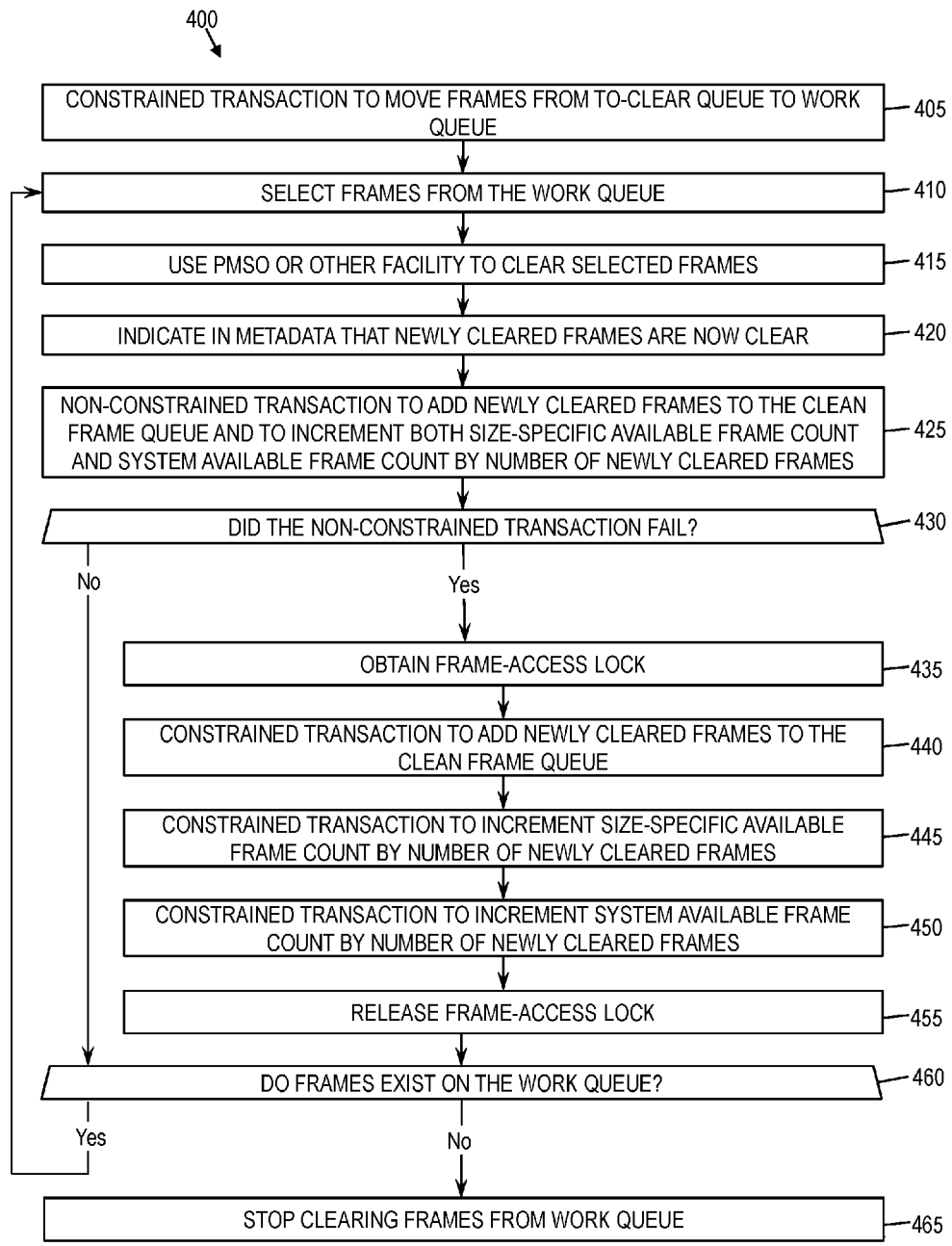
FIG. 4 is a flow diagram of a method for asynchronously clearing a batch of frames, according to some embodiments of this disclosure.

As discussed above, with respect to block 325, in some instances, a batch of frames 110 on the to-clear queue 140 may be cleared when the number of frames 110 in the to-clear queue 140 is at least the threshold. In some embodiments, the operation of clearing a batch of frames 110 may be performed as an SRB routine or by some other mechanism enabling a processor, other than one performing a unit of work that is requesting or releasing frames 110, to perform this operation. FIG. 4 is a flow diagram of a method 400 for clearing a batch of frames 110, according to some embodiments of this disclosure.

At block 405, in a single constrained transaction, one or more frames 110 may be removed from the to-clear queue 140 and added to the work queue 150. For example, in some embodiments, all frames 110 on the to-clear queue 140 may be removed and placed on the work queue 150. At block 410, one or more frames 110 on the work queue 150 may be selected for clearing and removed from the work queue 150. At block 415, the PMSO facility or other frame-clearing facility may be used to clear the selected frames 110. At block 420, metadata associated with the newly cleared frames 110 may be modified to indicate that these frames 110 are clean. For example, in some embodiments, the PFTEs associated with these frames 110 may be modified to indicate that the frames 110 are clean.

At block 425, in a single non-constrained transaction, the newly cleared frames 110 may be added to the clean frame queue 120, the size-specific available frame count may be incremented by the number of newly cleared frames 110 added to the clean frame queue 120, and the system available frame count may be incremented by the number of newly cleared frames 110 added to the clean frame queue 120. At decision block 430, it may be determined whether the non-constrained transaction of block 425 failed. If the non-constrained transaction failed, then at block 435, the frame-access lock 190 may be obtained. At block 440, in a first constrained transaction, the newly cleared frames 110 may be added to the clean frame queue 120. At block 445, in a second constrained transaction, the size-specific available frame count may be incremented by the number of newly cleared frames 110 added to the clean frame queue 120. At block 450, in a third constrained transaction, the system available frame count may be incremented by the number of newly cleared frames 110 added to the clean frame queue 120. In some embodiments, the first, second, and third constrained transactions may be distinct constrained transactions. At block 455, the frame-access lock 190 may be released.

In some embodiments, the operations of blocks 410 through 455 may be repeated asynchronously (i.e., outside of the performance of units of work) while frames 110 remain on the work queue 150. To this end, at decision bock 460, it may be determined whether additional frames 110 exist on the work queue 150. If so, then the method 400 may return to block 410 to select more frames 110 from the work queue 150. If no frames 110 exist on the work queue 150, then the method 400 may end at block 465. It will be understood, however, that this method 400 may be restarted when additional frames 110 are ready to be added to the work queue 150.

Figure 5:
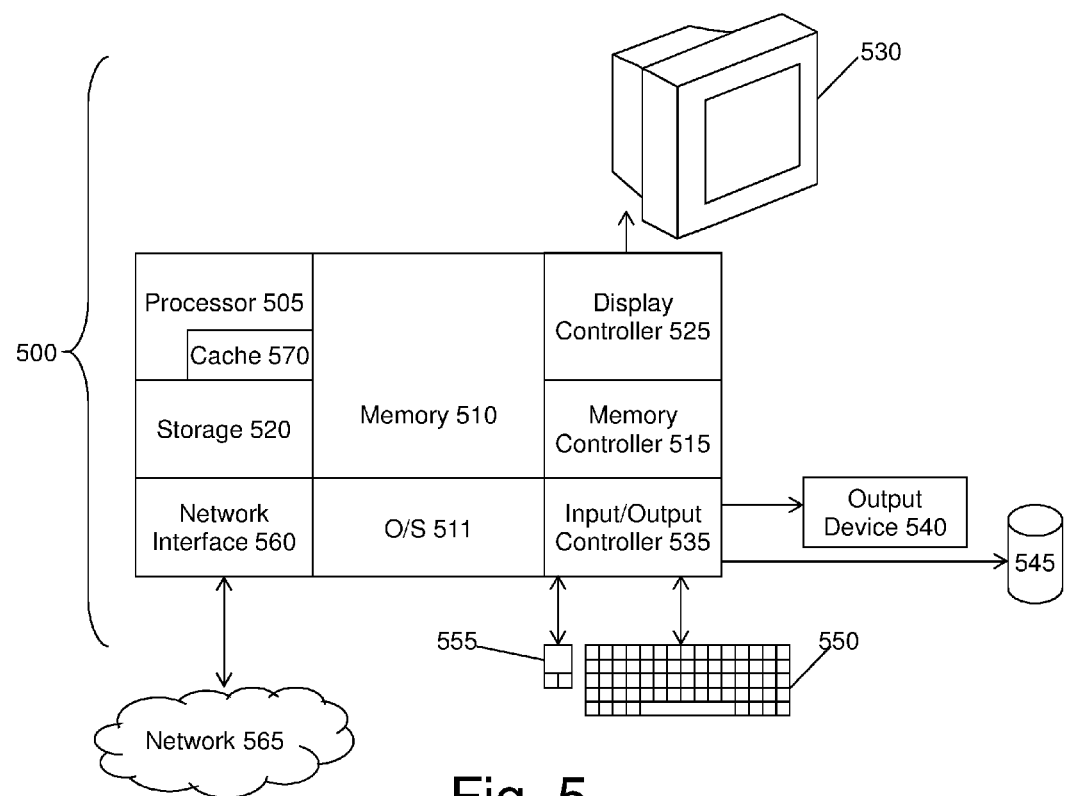
FIG. 5 is a block diagram of a computer system for implementing some or all aspects of the frame-management system, according to some embodiments of this disclosure.

FIG. 5 illustrates a block diagram of a computer system 500 for use in implementing a frame-management system or method according to some embodiments. The frame-management systems and methods described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). In some embodiments, the memory 510 may be accessible and updateable by the transactional memory facility 180. Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the frame-management systems and methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Frame-management systems and methods according to this disclosure may be embodied, in whole or in part, in computer program products or in computer systems 500, such as that illustrated in FIG. 5.

Technical effects and benefits of some embodiments include the ability clear frames 110 asynchronously by using the PMSO facility or other frame-clearing mechanism capable of running on a processor distinct from the processors performing units of work. Further, in some embodiments, the use of transactional memory may reduce the quantity of processor cycles spent spinning on a lock, as conventional to conventional systems. As a result, overall processor cycles may be reduced, and units of work need not be charged for the operations of clearing frames 110.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory having computer readable instructions; and
   one or more processors for executing the computer readable instructions, the computer readable instructions comprising:
      receiving from a first processor a first request for a frame for use in backing a virtual memory page of a unit of work;
      producing one or more clean frames for use in backing virtual memory pages, the producing the one or more clean frames comprising clearing a batch of one or more frames selected from a to-clear queue, and the producing the one or more clean frames being performed asynchronously from the unit of work being performed by the first processor;
      adding the one or more clean frames to a clean frame queue, the clean frame queue comprising a plurality of clean frames that have been cleared;
      adding one or more used frames to a standard frame queue, the one or more used frames having not yet been cleared, wherein the standard frame queue is distinct from the clean frame queue and distinct from the to-clear queue;
      removing a clean frame, of the one or more clean frames, from the clean frame queue, responsive to the first request, wherein the removing the clean frame from the clean frame queue comprises:
      attempting to remove the clean frame from the clean frame queue through a non-constrained transaction on transactional memory, using a transactional memory facility, absent obtaining a spin lock to access the clean frame queue;
      determining that the non-constrained transaction failed; and
      performing the removing the clean frame from the clean frame queue through a constrained transaction on the transactional memory, responsive to determining that the non-constrained transaction failed, wherein the performing the removing comprises obtaining the spin lock to access the clean frame queue;
      delivering the clean frame to the first processor, responsive to the first request;
      receiving a second request for a frame;
      determining that the transactional memory facility is unavailable for fulfilling the second request; and
      removing a used frame from the standard frame queue, responsive to determining that the transactional memory facility is unavailable.

* * * * *